United States Patent
Sivaraj et al.

(10) Patent No.: US 12,470,497 B2
(45) Date of Patent: *Nov. 11, 2025

(54) STREAMING AUGMENTED REALITY DATA IN A FIFTH GENERATION (5G) OR OTHER NEXT GENERATION NETWORK

(71) Applicant: AT&T Intellectual Property I, L.P., Atlanta, GA (US)

(72) Inventors: Rajarajan Sivaraj, Dublin, CA (US); Kittipat Apicharttrisorn, Riverside, CA (US); Bharath Balasubramanian, Princeton, NJ (US); Rittwik Jana, Montville, NJ (US); Subhabrata Sen, Westfield, NJ (US); Dhruv Gupta, San Ramon, CA (US); Jin Wang, Fremont, CA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 213 days.

This patent is subject to a terminal disclaimer.

(21) Appl. No.: 18/187,579

(22) Filed: Mar. 21, 2023

(65) Prior Publication Data

US 2023/0224254 A1 Jul. 13, 2023

Related U.S. Application Data

(63) Continuation of application No. 17/106,776, filed on Nov. 30, 2020, now Pat. No. 11,627,092.

(51) Int. Cl.
*H04L 47/36* (2022.01)
*H04W 28/06* (2009.01)

(52) U.S. Cl.
CPC .......... *H04L 47/365* (2013.01); *H04W 28/06* (2013.01)

(58) Field of Classification Search
CPC ............................ H04L 47/365; H04W 28/06
See application file for complete search history.

(56) References Cited

U.S. PATENT DOCUMENTS

| | | | | |
|---|---|---|---|---|
| 11,627,092 | B2* | 4/2023 | Sivaraj | H04L 47/365 370/229 |
| 12,062,215 | B2* | 8/2024 | Yip | G06T 19/00 |
| 2012/0327119 | A1* | 12/2012 | Woo | G06F 3/147 345/633 |
| 2020/0067952 | A1* | 2/2020 | Deaguero | G06F 21/552 |
| 2021/0243749 | A1* | 8/2021 | Hoang | H04W 24/08 |
| 2021/0410129 | A1* | 12/2021 | Freda | H04W 72/20 |

* cited by examiner

*Primary Examiner* — Sujoy K Kundu
*Assistant Examiner* — Weibin Huang
(74) *Attorney, Agent, or Firm* — Guntin & Gust, PLC; Ralph Trementozzi

(57) ABSTRACT

The technologies described herein are generally directed to modeling radio wave propagation in a fifth generation (5G) network or other next generation networks. For example, a method described herein can include, for a network application, identifying, by a system comprising a processor, a characteristic value of a performance characteristic associated with an uplink connection enabled via a network of a user equipment to application server equipment hosting the network application. The method can further include, based on the characteristic value and a criterion, selecting, by the system, a first packet size for the uplink connection. The method can further include communicating, by the system, to the user equipment, the first packet size for use with the uplink connection.

20 Claims, 10 Drawing Sheets

STREAMING AUGMENTED REALITY DATA IN A FIFTH GENERATION (5G) OR OTHER NEXT GENERATION NETWORK

RELATED APPLICATION

The subject patent application is a continuation of, and claims priority to, U.S. patent application Ser. No. 17/106,776, filed Nov. 30, 2020, and entitled "STREAMING AUGMENTED REALITY DATA IN A FIFTH GENERATION (5G) OR OTHER NEXT GENERATION NETWORK," the entirety of which priority application is hereby incorporated by reference herein.

TECHNICAL FIELD

The subject application is related to implementation of fifth generation (5G) wireless communication systems or other next generation wireless communication systems, and, for example, different approaches to reducing latency for certain types of streaming data.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
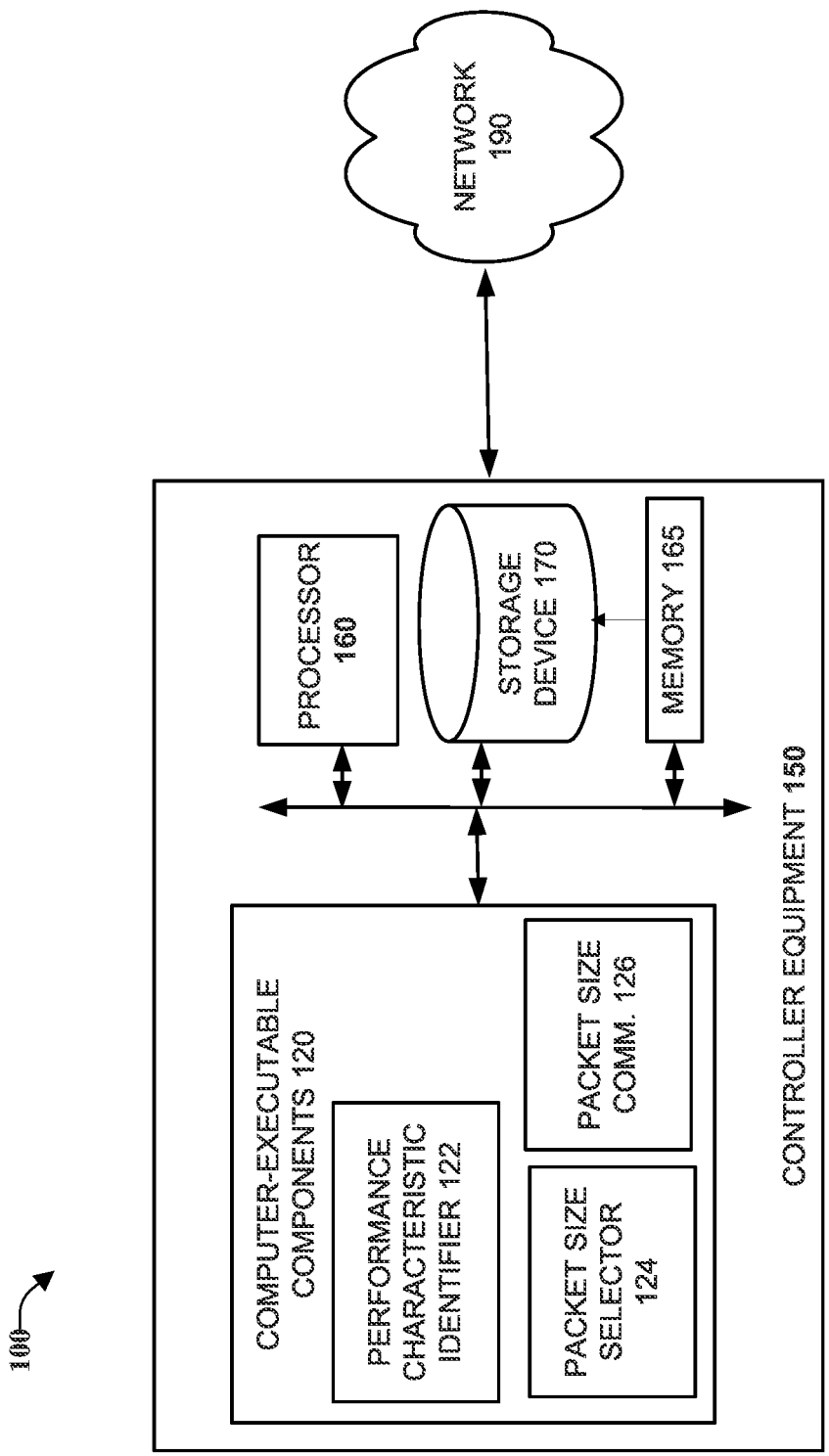
FIG. 1 is an architecture diagram of an example system that can facilitate controlling network transmission parameters to reduce streaming latency, in accordance with one or more embodiments.

Generally speaking, one or more embodiments can facilitate increasing bandwidth and reducing latency in streaming distributed application content over wireless links. In addition, one or more embodiments described herein can be directed towards a multi-connectivity framework that supports the operation of new radio (NR, sometimes referred to as 5G). As will be understood, one or more embodiments can allow an integration of user devices with network assistance, by supporting control and mobility functionality on cellular links (e.g., long term evolution (LTE) or NR). One or more embodiments can provide benefits including, system robustness, reduced overhead, and global resource management, while facilitating direct communication links via a NR sidelink.

It should be understood that any of the examples and terms used herein are non-limiting. For instance, while examples are generally directed to non-standalone operation where the NR backhaul links are operating on millimeter wave (mmWave) bands and the control plane links are operating on sub-6 GHz LTE bands, it should be understood that it is straightforward to extend the technology described herein to scenarios in which the sub-6 GHz anchor carrier providing control plane functionality could also be based on NR. As such, any of the examples herein are non-limiting examples, any of the embodiments, aspects, concepts, structures, functionalities or examples described herein are non-limiting, and the technology may be used in various ways that provide benefits and advantages in radio communications in general.

In some embodiments the non-limiting terms "signal propagation equipment" or simply "propagation equipment," "radio network node" or simply "network node," "radio network device," "network device," and access elements are used herein. These terms may be used interchangeably, and refer to any type of network node that can serve user equipment and/or be connected to other network node or network element or any radio node from where user equipment can receive a signal. Examples of radio network node include, but are not limited to, base stations (BS), multi-standard radio (MSR) nodes such as MSR BS, gNodeB, eNode B, network controllers, radio network controllers (RNC), base station controllers (BSC), relay, donor node controlling relay, base transceiver stations (BTS), access points (AP), transmission points, transmission nodes, remote radio units (RRU) (also termed radio units herein), remote ratio heads (RRH), and nodes in distributed antenna system (DAS). Additional types of nodes are also discussed with embodiments below, e.g., donor node equipment and relay node equipment, an example use of these being enabled via a network with an integrated access backhaul network topology.

In some embodiments, the non-limiting term user equipment (UE) is used. This term can refer to any type of wireless device that can communicate with a radio network node in a cellular or mobile communication system. Examples of UEs include, but are not limited to, a target device, device to device (D2D) user equipment, machine type user equipment, user equipment capable of machine to machine (M2M) communication, PDAs, tablets, mobile terminals, smart phones, laptop embedded equipped (LEE), laptop mounted equipment (LME), USB dongles, and other equipment that can have similar connectivity. Example UEs are described further with FIGS. 9 and 10 below. Some embodiments are described in particular for 5G new radio systems. The embodiments are however applicable to any radio access technology (RAT) or multi-RAT system where the UEs operate using multiple carriers, e.g., LTE.

The computer processing systems, computer-implemented methods, apparatus and/or computer program products described herein employ hardware and/or software to solve problems that are highly technical in nature (e.g., rapidly labeling parts of images based on different criteria), that are not abstract and cannot be performed as a set of mental acts by a human. For example, a human, or even a plurality of humans, cannot efficiently integrate wireless data receipt and demodulation (which generally cannot be performed manually by a human) and detailed analysis of information about a wireless connection, with the same level of accuracy and/or efficiency as the various embodiments described herein.

Aspects of the subject disclosure will now be described more fully hereinafter with reference to the accompanying drawings in which example components, graphs and selected operations are shown. In the following description, for purposes of explanation, numerous specific details are set forth in order to provide a thorough understanding of the various embodiments. For example, some embodiments described can facilitate controlling network transmission parameters to reduce streaming latency. Different examples that describe these aspects are included with the description of FIGS. 1-10 below. It should be noted that the subject disclosure may be embodied in many different forms and should not be construed as limited to this example or other examples set forth herein.

For example, one or more examples discussed herein concern operating requirements of bandwidth-intensive applications that can require low-latency for successful operation over a wireless network. One example of this type of application is an augmented reality (AR) distributed application, e.g., some implementations of AR applications can be improved by improving end-to-end latency, throughput as well as application goodput for uplink AR streaming. It should be noted that these example are non-limiting, and that one or more embodiments can be applicable to other types of applications, including but not limited to other 5G enhanced mobile broadband (eMBB) and ultra-reliable low latency communication (uRLLC) streaming applications like video, virtual reality (VR), connected cars, and mission critical communication.

FIG. 1 is an architecture diagram of an example system 100 that can facilitate controlling network transmission parameters to reduce streaming latency, in accordance with one or more embodiments. For purposes of brevity, description of like elements and/or processes employed in other embodiments is omitted.

As depicted, system 100 can include controller equipment 150 communicatively coupled to network 190. In one or more embodiments, controller equipment can include computer executable components 120, processor 160, storage device 170, and memory 165. Computer executable components 120 can include performance characteristic identifier 124, packet size selector 124, packet size communicator 126, and other components described or suggested by different embodiments described herein that can improve the operation of system 100. It should be appreciated that these components, as well as aspects of the embodiments of the subject disclosure depicted in this figure and various figures disclosed herein, are for illustration only, and as such, the architecture of such embodiments are not limited to the systems, devices, and/or components depicted therein. For example, in some embodiments, controller equipment 150 can further comprise various computer and/or computing-based elements described herein with reference to operating environment 1000 and FIG. 10.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure.

According to multiple embodiments, storage device 170 can include, but is not limited to, RAM, ROM, EEPROM, flash memory or other memory technology, solid state drive (SSD) or other solid-state storage technology, Compact Disk Read Only Memory (CD ROM), digital video disk (DVD), blu-ray disk, or other optical disk storage, magnetic cassettes, magnetic tape, magnetic disk storage or other magnetic storage devices, or any other medium which can be used to store the desired information and which can be accessed by the computer.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a system on a chip (SOC), an array processor, a vector processor, and other types of processors. Further examples of processor 160 are described below with reference to processing unit 1004 of FIG. 10. Such examples of processor 160 can be employed to implement any embodiments of the subject disclosure.

In one or more embodiments, computer executable components 120 can be used in connection with implementing one or more of the systems, devices, components, and/or computer-implemented operations shown and described in connection with FIG. 1 or other figures disclosed herein. For example, in one or more embodiments, computer executable components 120 can include instructions that, when executed by processor 160, can facilitate performance of operations defining performance characteristic identifier 122. As discussed with FIGS. 2 and 3 below, performance characteristic identifier 122 can, in accordance with one or more embodiments, identify a characteristic value of a performance characteristic of an uplink connection enabled via a network of a user equipment to application server equipment hosting the network application.

In another example, in one or more embodiments, computer executable components 120 can include instructions that, when executed by processor 160, can facilitate performance of operations defining packet size selector 124. As discussed with FIGS. 2 and 3 below, packet size selector 124 can, in accordance with one or more embodiments, based on the characteristic value from performance characteristic identifier 122 and a criterion, select a packet size for the uplink connection.

In another example, in one or more embodiments, computer executable components 120 can include instructions that, when executed by processor 160, can facilitate performance of operations defining packet size communicator 126. As discussed with FIGS. 2 and 3 below, packet size communicator 126, can, in accordance with one or more embodiments, communicate to the user equipment, the selected packet size for use with the uplink connection.

It should be noted that, in embodiments discussed herein, the uplink connection is for the network application, e.g., used for uplink communication to a base station by a user equipment for operation of the network application. One having skill in the relevant art(s), given the description herein, would appreciate that characteristics of the uplink connection can vary because of different application instances. For example, for some applications, the uplink connection can be a persistent and ongoing connection, maintained while the application executes, while for implementations of other applications, e.g., VR and AR applications can have this type of connection. In other application instances, the uplink connection can also be persistent, but the traffic can be more ephemeral, including frequent discrete data requests and responses, based on trigger events, e.g., not necessarily on an ongoing basis. In accordance with different embodiments described and suggested herein, both of these and similar types of uplink connections can also be subject to the same types of problems addressed by approaches described herein, e.g., for ongoing latency problems as well as latency problems over the duration of multiple, persistent requests.

Figure 2:
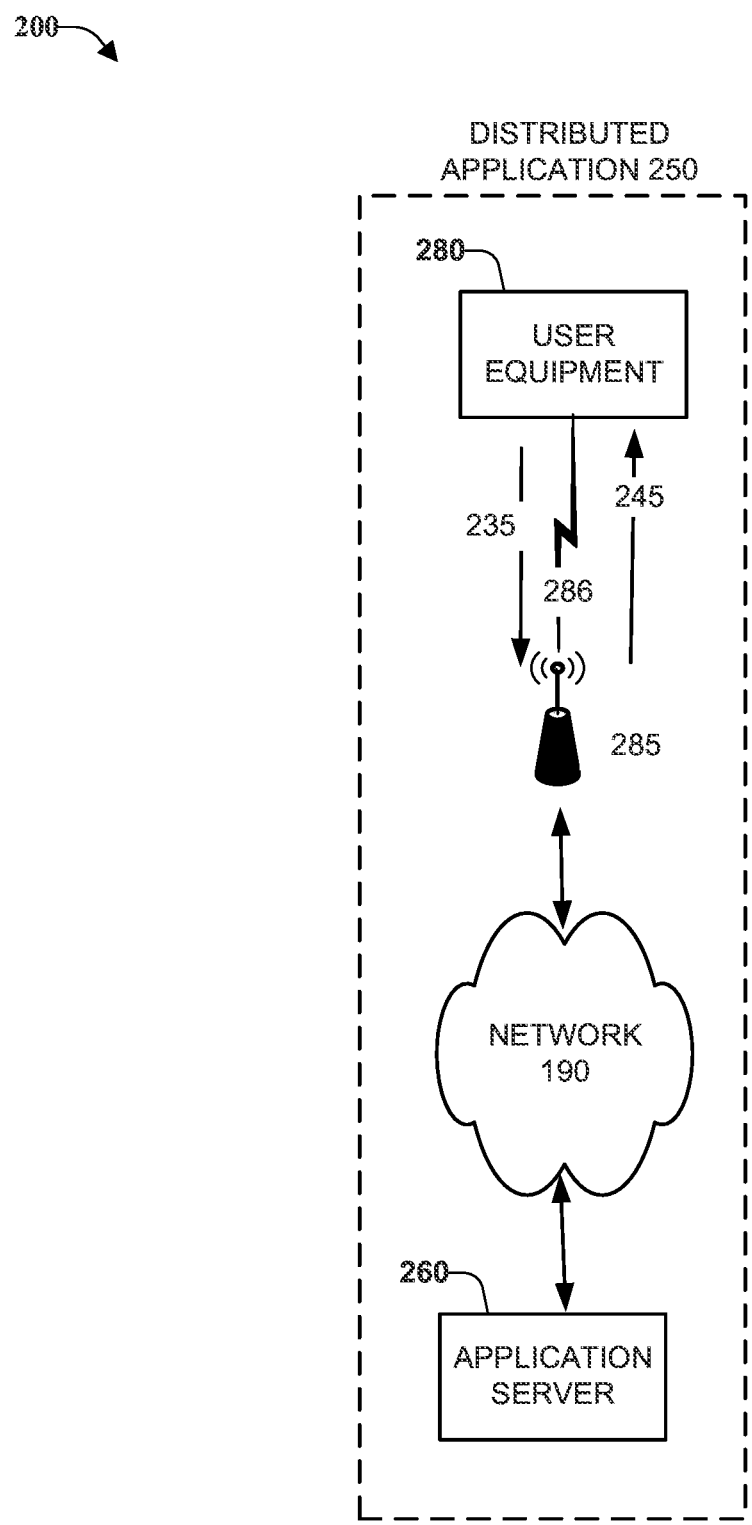
FIG. 2 is a diagram of a non-limiting example system for operating distributed application, in accordance with one or more embodiments.

FIG. 2 is a diagram of a non-limiting example system 200 for operating distributed application 250, in accordance with one or more embodiments. For purposes of brevity, description of like elements and/or processes employed in other embodiments is omitted. System 200 can include distributed application 250, with functions distributed between user equipment 280 and application server 260 via base station 285 and network 190, in accordance with one or more embodiments.

In an aspect highlighted in FIG. 2 and discussed further with FIGS. 3-5 below, wireless link 286 between user equipment 280 and base station 285 includes wireless uplink 235 and wireless downlink 245. As used herein, user equipment 280 can be described by terms like "UE" "mobile station," "mobile," subscriber station," "subscriber equipment," "access terminal," "terminal," "handset," and similar terminology, e.g., a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, base station 285 can be described by terms utilized interchangeably in the subject application, including, but not limited to, "access point (AP)," "base station," "NodeB," "evolved Node B (eNodeB)," "home Node B (HNB)," "home access point (HAP)," "cell device," "sector," "cell," and the like, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

It should be noted that, in some examples discussed herein, distributed application 250 can be an application with a state shared across multiple devices (e.g., requiring low latency) and with a relatively large amount of information communicated to facilitate the shared state. Example applications can include, but are not limited to multi-player, multimedia intensive distributed applications (e.g., some computer games) as well as emerging applications such as AR and VR applications. One having skill in the relevant art(s), given the description herein, would appreciate that other types of low-latency, high-bandwidth distributed applications can also benefit from one or more embodiments described herein.

It should be noted that exemplary embodiments described herein are intended to improve the operation of distributed application 250 when communications with user equipment 280 is via wireless link 286. Specifically, one or more embodiments can, in some circumstances, increase throughput and reduce latency in wireless uplink 235. Further, as depicted herein, an example distributed application 250 requires a persistent connection be maintained between application server 260 and user equipment 280, e.g., AR applications can require this type of ongoing connection.

Figure 3:
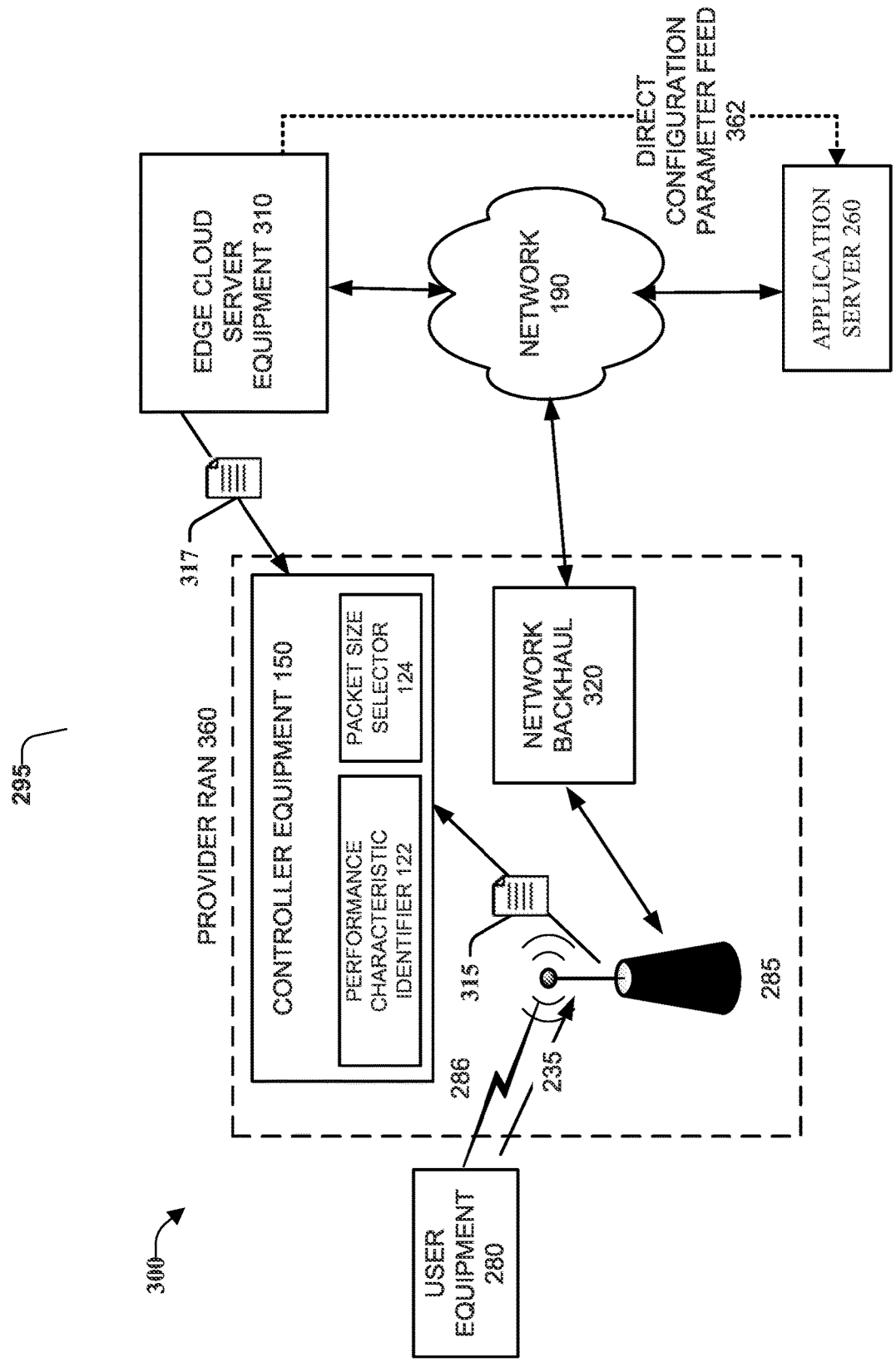
FIG. 3 is a diagram of edge cloud server equipment providing services to elements of provider radio access network (RAN) and application server, in accordance with one or more embodiments.

FIG. 3 is a diagram of edge cloud server equipment providing services to elements of provider RAN 360 and application server 260, in accordance with one or more embodiments. For purposes of brevity, description of like elements and/or processes employed in other embodiments is omitted. System 300 can include user equipment 280 communicatively coupled to application server via provider RAN 360 and network 190, and edge cloud server equipment 310. In one or more embodiments, as depicted in FIG. 3, provider RAN 360 can include wireless link 286 between user equipment 280 and base station 285 as well as connections between base stations and network backhaul 320. Provider RAN 360 an also include controller equipment 150 with packet size selector 124, as discussed above with FIG. 1.

For additional context, different characteristics of an augmented reality application are included below. In an AR application, virtual objects can be served by application server 260 to multiple UE devices, e.g., UE 280 and other UEs not shown. In an AR function, a virtual object can be hosted by a hosting UE and rendered by a rendering UE. When the hosting UE hosts a virtual object in an AR application, the virtual object can sent via wireless uplink 235 of provider RAN 360 (e.g., a 4G/5G cellular RAN) to an AR cloud server (e.g., application server 260), and then downloaded by the rendered UE over the cellular RAN using a wireless downlink similar to wireless downlink 245. Once downloaded, an AR application installed on the rendered UE can locally render the virtual object.

As noted above, to facilitate one or more embodiments, performance characteristic identifier 122 can identify values of performance characteristics 315 received from base station 285 describing aspects of the operation of provider RAN 360 for the execution of distributed application 250. One approach that can be used to facilitate the identification of performance characteristics (also termed key performance indicators (KPIs)) is to cause base station 285 (e.g., such as a 4G LTE eNB or a 5G NR gNB) to collect (e.g., over a trace interface) real-time RAN performance measurements data for individual UEs, cells and network elements, e.g., centralized unit (CU), distributed unit (DU), and (RU).

In one or more embodiments, performance characteristic identifier 122 of controller equipment 150 can receive these RAN measurements in real-time, e.g., as Kafka streams. Once identified, in one or more embodiments, performance characteristic identifier 122 can compute and predict the key performance indicators (KPIs). In one or more embodiments, computed and predicted KPIs can include, but are not limited to performance characteristics that are specific to a UE and performance characteristics that are specific to a particular cell. UE specific KPIs can include RAN latency, RAN throughput, and signal strength values such as RSRP/RSRQ, the number of RLC PDU segments per IP packet utilized by the UE, RLC PDU size, and other similar UE performance characteristics. Cell-specific KPIs can include PRB utilization, the number of active UEs utilizing the cell, and other similar cell coverage performance characteristics. In one or more embodiments, the example KPIs discussed above can be relevant to selecting IP packet sizes to improve performance discussed herein.

As discussed herein a maximum transmission unit (MTU) parameter for network communication sets the largest possible frame size of a communications protocol data unit (PDU) in an open systems interconnection (OSI) model layer 2 data network, e.g., packets used in an internet protocol (IP) network. It should be noted that, although IP networks and packet size are used for examples herein, one having skill in the relevant art(s), given the description herein would appreciate that one or more embodiments can be applied to network protocols that can use different ranges of data unit sizes, e.g., some modern protocols can use MTU sizes greater than 4 kilobytes.

Conventionally, MTU size has been dictated based on properties of network communications links, e.g., in more error prone communications links, a smaller MTU parameter facilitates identifying and resending erroneous frames faster, and when errors in frames occur, less data is impacted. Initial MTU sizes in Ethernet networks were up to 1500 bytes, with Ethernet version 2 maintaining this size, plus 18 bytes of added header and error correction information. In modern systems however, fewer errors in network communications have led, in some circumstances, to approaches where MTU sizes are increased to reduce latency and increase throughput. For example, smaller MTU sizes can result in increased network overhead due to factors including the generation of a higher number of packets for the same burst, and under-utilization of available RAN capacity.

In contrast to this conventional approach, for reasons discussed below, some implementations discussed herein can reduce packet sizes for certain types of links (e.g., wireless uplink 235 of UE 280), in certain circumstances with factors including, but not limited to RAN congestion level, and radio frequency signaling conditions of UE 280. One way that one or more embodiments can improve throughput and latency of AR communications is to actively seek to prevent adverse effects of network congestion control measures, e.g., TCP congestion-control protocol.

One having skill in the relevant art(s), given the description herein, congestion-control protocols can actively limit the network traffic to prevent network congestion. An example element of TCP congestion-control is a variable size congestion window for each connection, with a larger congestion window corresponding in some circumstances to a detrimental reduction in throughput and increase in latency, and a smaller congestion window corresponding to fewer uplink restrictions. Another element of the TCP congestion-control protocol is a provision to have a 'slow start' to the resumption of uplink traffic after such traffic is paused.

In an exemplary embodiment, based on performance characteristics measured from the operation of UE 280, packet size selector 124 can beneficially select a smaller MTU parameter size for wireless uplink 235, e.g., selected packet size 317. For example, when distributed application 250 is an AR application, and larger IP packet sizes are used for streaming AR content to UE 280, in some circumstances, heavier segmentation can occur in the radio link control (RLC) layer of the RAN, especially when the instantaneous RLC protocol data unit (PDU) sizes are set to be significantly smaller than the larger IP packet sizes. Unlike some other types of applications, for AR applications, instantaneous RLC PDU can be set to be smaller than IP packet sizes in scenarios when the RAN is congested and/or when the UE's RF signaling conditions are poor, e.g., to facilitate addressing transmission errors.

As a result, the per-packet RLC latency and subsequently, the TCP round trip time (RTT) increase, adversely impacting the growth of the TCP congestion window during an uplink AR burst, deteriorating the end-to-end performance of the AR session. While using smaller IP packets can help address this issue, they can increase network overhead in some circumstances due to generation of a higher number of packets for the same burst and under-utilization of the available RAN capacity.

In one or more embodiments however, analysis by packet size selector 124 can improve (e.g., in some cases optimize) the packet sizes selected for use with distributed application 250, e.g., by analyzing one or more performance characteristics of wireless link 286 between user equipment 280 and base station 285. In an example approach, packet size selector 124 can heuristically address a non-linear trade-off between negative aspects of smaller packet sizes and benefits that can accrue from using smaller packet sizes in some circumstances. For example, in selecting a new packet size, one or more embodiments can be configured to adapt IP packet sizes in accordance with an estimation of the trade-offs between the benefits and detriments of different packet sizes. For example, as discussed below, one or more embodiments can detect circumstances where different packet sizes are likely to lead to improvements in performance. For example, one or more embodiments can select a smaller packet size based on predicted benefits, but these benefits are predicted taking detriments associated with smaller packet sizes into account, e.g., smaller packet sizes can cause a loss of performance from additional overhead caused by the use of more packets for the same burst of data.

In one or more embodiments, conditions that can cause selection of a smaller packet size include, but are not limited to when high latency and low bandwidth issues are present (or predicted) and significant RLC segmentation of application packets is detected. In this example, embodiments can reduce the IP packet size to a size determined by other network conditions, e.g., selecting a new packet size closer to a moving average of the instantaneous RLC PDU sizes for the UE. Based on this and other determined adjustments, one or more embodiments can reduce latency and increase throughput by facilitating a quicker increase in the TCP congestion window for an AR burst from UE 280. Additional discussion of the relationship between latency, bandwidth, and packet size is discussed below with charts shown in FIG. 5A-5B.

To facilitate the adjustment to packet size base on network conditions, different performance characteristics can be predicted, measured, or derived, including but not limited to the example KPIs discussed above. These performance characteristics 315 can be identified by performance characteristic identifier 122 and utilized by packet size selector 124 to select the new packet size. In an alternative embodiment described with the discussion of edge cloud server equipment 310 with FIG. 4 below, performance characteristic identifier 122 can be used to perform some of the processes described above (e.g., predicting, measuring, or deriving performance characteristics 315), but the evaluation of factors and the selection of a packet size can be performed by services hosted by edge cloud server equipment 310.

Further, in an additional combination of features of one or more embodiments, performance characteristic 315 can be used to provide configuration information directly to application server 260 for the operation of distributed application 250. As depicted in FIG. 3 and discussed further with FIG. 4 below, direct configuration parameter feed 362 illustrates a logical path for information from edge cloud server equipment 310 to application server 260, e.g., with physical links being, for example, via network 190.

Figure 4:
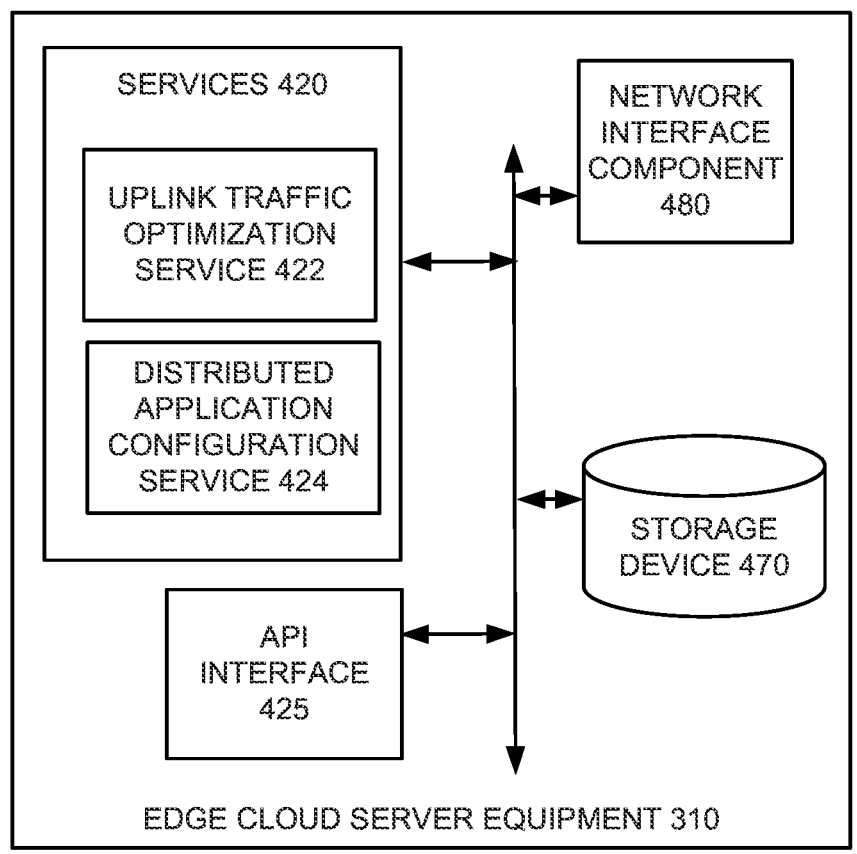
FIG. 4 depicts a system with a more detailed view of edge cloud server equipment, in accordance with one or more embodiments.

FIG. 4 depicts a system 400 with a more detailed view of edge cloud server equipment 310, in accordance with one or more embodiments. For purposes of brevity, description of like elements and/or processes employed in other embodiments is omitted. As depicted, system 400 can include edge cloud server equipment 310 with services 420, storage device 470, network interface component 480, and API interface 425. Services 420 can include packet size selection service 422 and distributed application configuration service 424. As noted above, edge cloud server equipment 310 with services 420 can facilitate additional embodiments described below.

As would be appreciated by one having skill in the relevant art(s), given the description herein, edge cloud server equipment 310 can be positioned at the edge of a network (e.g., nearer to customer applications and devices) in order to improve communication between provider RAN 360 elements and services available on edge cloud server equipment 310. In keeping with this concept, edge cloud server equipment 310 includes services that can be used by one or more embodiments to improve the performance of distributed application 250.

For example, in an alternative embodiment, functions described above as being performed by packet size selector 124 can be performed by this component using API interface 425 to use selection logic of packet size selection service 422. In this approach, KPIs can be identified by performance characteristic identifier 122 and exposed to edge cloud server equipment 310 (e.g., a public cloud platform deployed at the edge of provider RAN 360) via API interface 425. One benefit that can result from this hosting of packet size selection functions on edge cloud server equipment 310, is that these functions can be more widely available within provider RAN 360 and more resources can be allocated based on the shared use.

Another embodiment that can be facilitated by edge cloud server equipment 310 includes a logical direct configuration parameter feed 362 between resources of provider RAN 360 and application server 260. One way this can occur is that services of application server 260 can use API interface 425 to subscribe to an API management service. In this way, KPIs can be identified for the operation of UE 280 for distributed application 250, and these KPIs can be directly provided to application server 260 for analysis and adjustment, or the KPIs can be processed by distributed application configuration service 424, yielding configuration parameters that can be directly relayed to application server 260. These parameters can both configure the provision of distributed application 250 and set network streaming parameters for use by provider RAN 360.

Figure 5A:
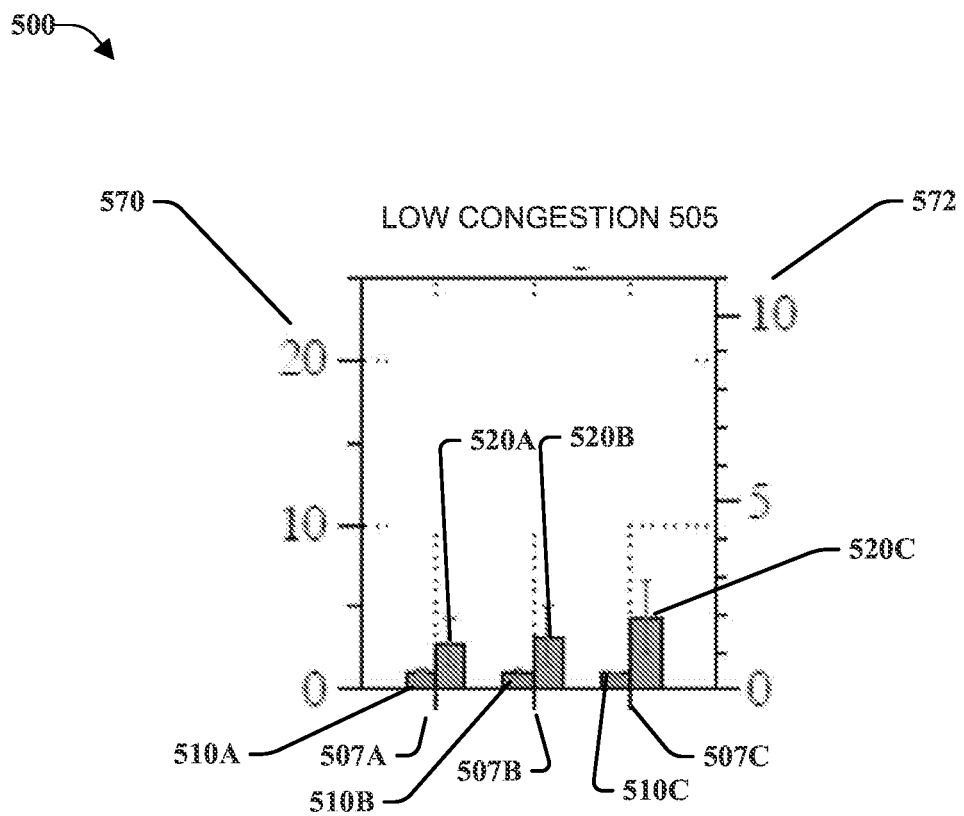
FIGS. 5A and 5B depict respective charts describing relationships between latency, segmentation, and maximum transmission unit (MTU) size discussed with one or more embodiments described above.
Figure 5B:
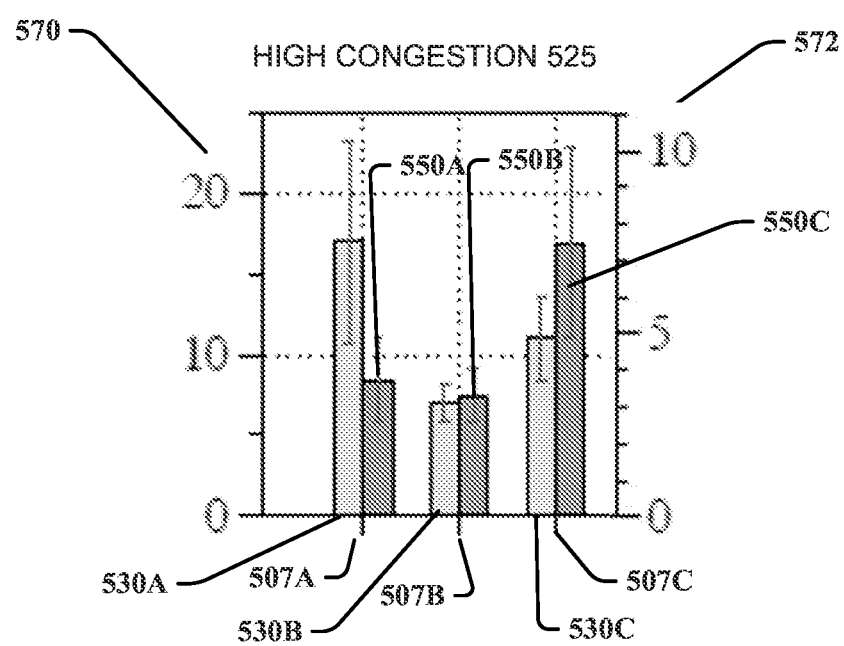

FIG. 5A depicts chart 500 depicting low network congestion 505 and FIG. 5B depicts chart for high network congestion 525, with both of these charts describing relationships between latency, segmentation, and MTU discussed with one or more embodiments described above. For purposes of brevity, description of like elements and/or processes employed in other embodiments is omitted.

As depicted, FIGS. 5A and 5B depict an example relationship between two KPIs and three different potential MTU sizes, e.g., MTU sizes that include small 507A (e.g., 400 bytes), medium 507B (e.g., 650 bytes), and almost maximum 507C (e.g., 1430 bytes). On the chart, label 570 corresponds to aggregate RAN latency in seconds, and label 572 corresponds to segmentation, e.g., average number of RLC PDUs per packet. It should be noted that, the aggregate RAN latency value as a measure of benefit is non-limiting, e.g., end-to-end latency, network throughput and application goodput can all be improved by one or more embodiments described herein.

In a high network congestion 525 example, FIG. 5B shows a relatively congested public LTE network (e.g., a college campus) scenario, with a default almost maximum 507C packet size of 1430 bytes, undergoing significant segmentation 550C, e.g., around seven (7) RLC PDUs per packet). As discussed above, based on this segmentation, aggregate RAN latency 530C is caused to be high, e.g., around 10 seconds. To facilitate selecting an MTU size that strikes a balance between the benefits and detriments of smaller MTU sizes noted above, one or more embodiments can predict results for a small 507A packet size, e.g., 400 bytes.

As with the example operation of embodiments described and suggested above, given the current size of 1430 bytes with the latency 530C discussed above, and a prediction of the highest latency in the example (e.g., latency 530A), for an MTU of 400 bytes, one or more embodiments can select medium 507B with an MTU of 650 bytes. Upon setting this, the aggregate RAN latency 570 is reduced by 37% and 58%, when compared to 1430 bytes and 400 bytes, respectively. At the same time, in this representative example, the network throughput and the AR application goodput from a 650-byte packet size increases by over 62% and 100% than the 1430-byte and 400-byte packet sizes.

In contrast to the results of FIG. 5B, in low network congestion 505 environment of FIG. 4A, (e.g., the mall), reducing the packet size from 1430 bytes to either 650 bytes or 400 bytes has little impact on aggregate RAN latency 570. In an example, this result can be caused by base station 285 (e.g., an eNB), based on low congestion, already being configured to allocate a larger RLC PDU to UE 280, resulting in little RLC segmentation, 520A-C. In this situation, an example operation of one or more embodiments can select the default large packet size close to 1430 bytes, e.g., increasing performance without predicted increase in latency.

Figure 6:
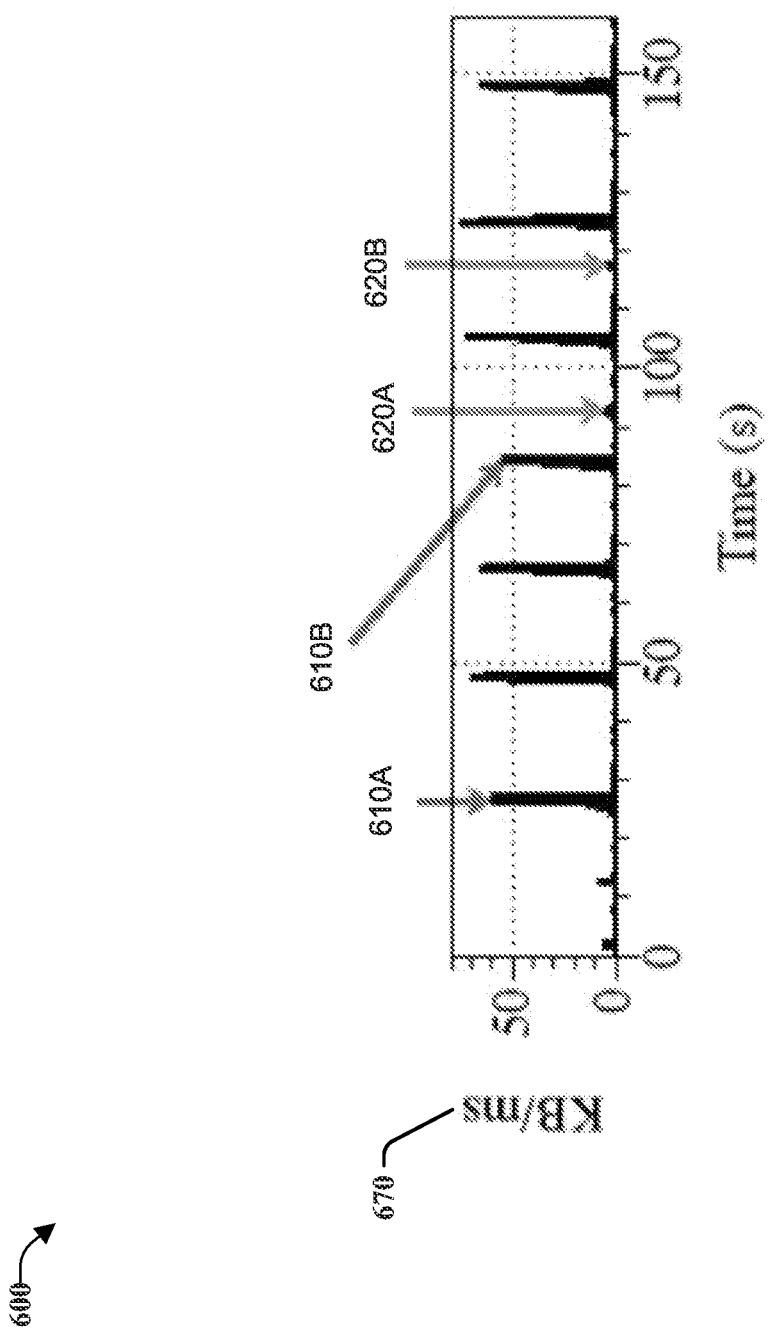
FIG. 6 depicts a system that includes features of additional embodiments facilitate by services of edge cloud server equipment, in accordance with one or more embodiments.

FIG. 6 depicts a system 600 that includes features of additional embodiments facilitate by services of edge cloud server equipment 310, in accordance with one or more embodiments. For purposes of brevity, description of like elements and/or processes employed in other embodiments is omitted. In these embodiments, the measured KPI data described above can be used to improve the operation of distributed application 250 in a different way. To illustrate these embodiments, characteristics of the example AR application are discussed below.

To understand the network traffic characteristics of AR application, (e.g., why and how often data transmissions occur) it is useful to consider that data transmissions can be based on AR user interactions with the AR environment, e.g., placing virtual objects, drawing virtual graffiti. In addition, because AR applications can involve the exchange of graphic information, the irregular data transmissions can be large, e.g., AR applications can be characterized as having inconsistent traffic levels for uplink traffic-subject to occasional bursts of data being transmitted. For example, FIG. 6 depicts a sample throughput trace of a user equipment running an AR application, e.g., points 610A-B correspond to large spikes correspond to large data transmission bursts when the user touches the screen of the user equipment.

One aspect that can describe AR applications is that, when they exhibit large, unpredictable data spikes on the same TCP connection, this can result in TCP congestion protocol re-triggering a TCP slow start each after each periodic burst, e.g., restricting bandwidth to prevent congestion, as discussed with FIG. 3 above. To improve operation of distributed application 250, one or more embodiments can regularly provide information on uplink data availability to base station 285, e.g., to optimize resource allocation, latency and throughput for the AR UE. This can be accomplished, for example, by generating small payloads of dummy data from the UE hosting the virtual object in the AR application. Then the "size" and "periodicity" of the background traffic payload can be assessed and reported to edge cloud server equipment 310 using API interface 425. A beneficial result of this additional, regularly provided information from UE 280, the inconsistent uplink traffic levels that can occur with AR distributed application 250 can be less likely to re-trigger the slow start provisions discussed above.

Stated differently, one or more embodiments can generate small amounts of background traffic periodically, so that the UE always has "minimal" resources to be able to uplink the periodically-generated small background traffic payload (e.g., depicted in FIG. 6), and in the process, piggyback information about the residual buffer size of the UE. In different embodiments, this periodic generation of small background traffic can have benefits that include, but are not limited to improving uplink AR streaming in terms of end-to-end latency, throughput and goodput, and helping to eliminate the additional latency involved in requesting the eNB/gNB of resources when the UE gets fresh AR payload data in its buffer. Moreover, the piggybacked UE buffer size information can improve the likelihood that the cellular RAN base station is always apprised of the uplink buffer size of the UE that results in buffer-aware allocation of PRBs to the UE, even during the initial resource allocation after arrival of fresh AR payload data into UE's uplink buffers. It should be noted that the example KPIs discussed with FIG. 3 above, including UE-specific and cell-specific performance characteristics, can also be useful for controlling aspects of this beneficial periodic generation of data, e.g., by selecting the size and periodicity of the background traffic.

Figure 7:
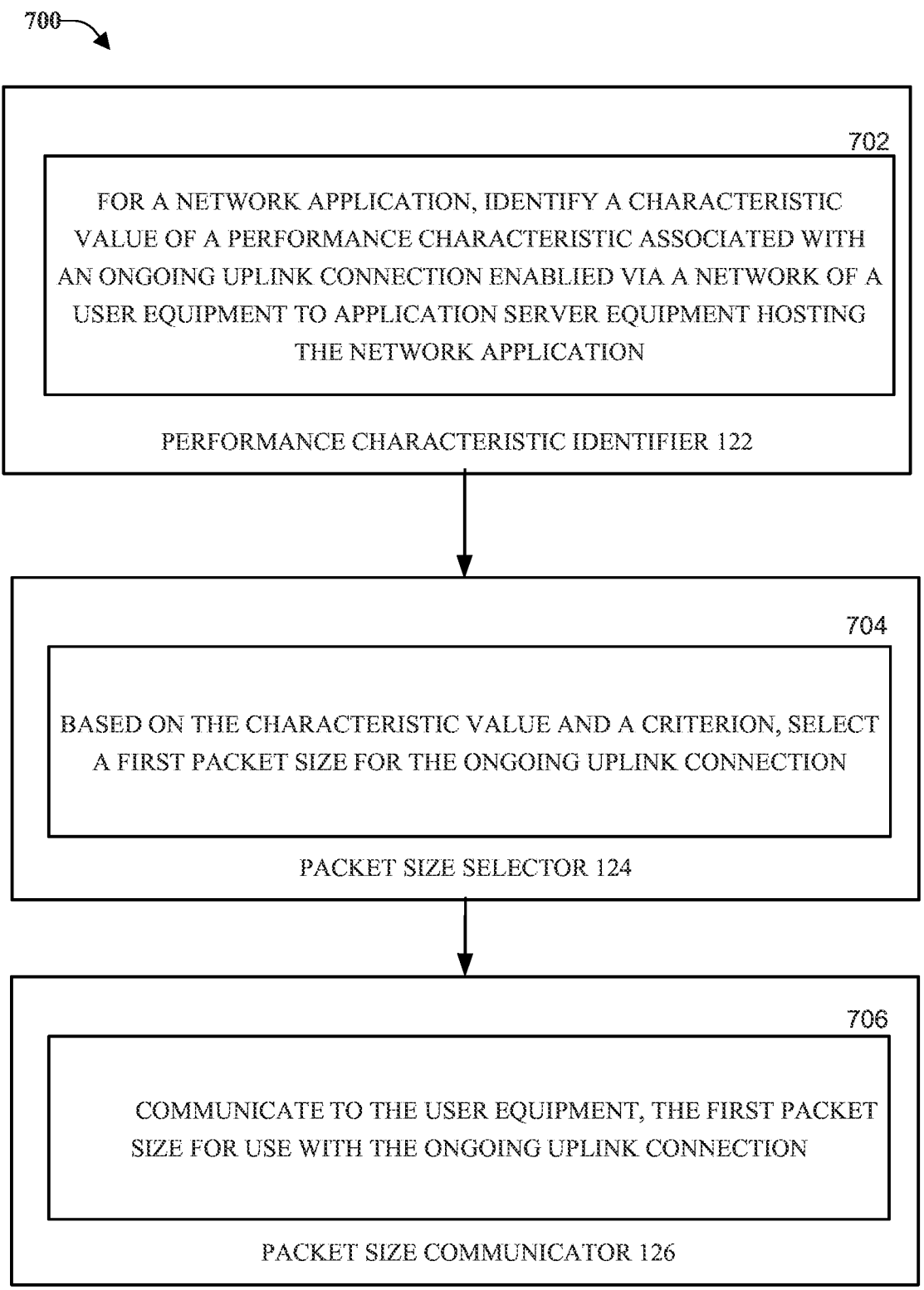
FIG. 7 illustrates an example system that can facilitate controlling network transmission parameters to reduce streaming latency, in accordance with one or more embodiments.

FIG. 7 illustrates an example system 700 that can facilitate controlling network transmission parameters to reduce streaming latency, in accordance with one or more embodiments. For purposes of brevity, description of like elements and/or processes employed in other embodiments is omitted.

As depicted, system 700 includes performance characteristic identifier 122, packet size selector 124, and packet size communicator 126. In one or more embodiments, performance characteristic identifier 122 can be configured 702 to, for a network application, identify a characteristic value of a performance characteristic associated with an uplink connection enabled via a network of a user equipment to application server equipment hosting the network application.

In one or more embodiments, performance characteristic identifier 122 can be configured 704 to, based on the characteristic value and a criterion, select a first packet size for the uplink connection. In one or more embodiments, performance characteristic identifier 122 can be configured 706 to, communicate to the user equipment, the first packet size for use with the uplink connection.

Figure 8:
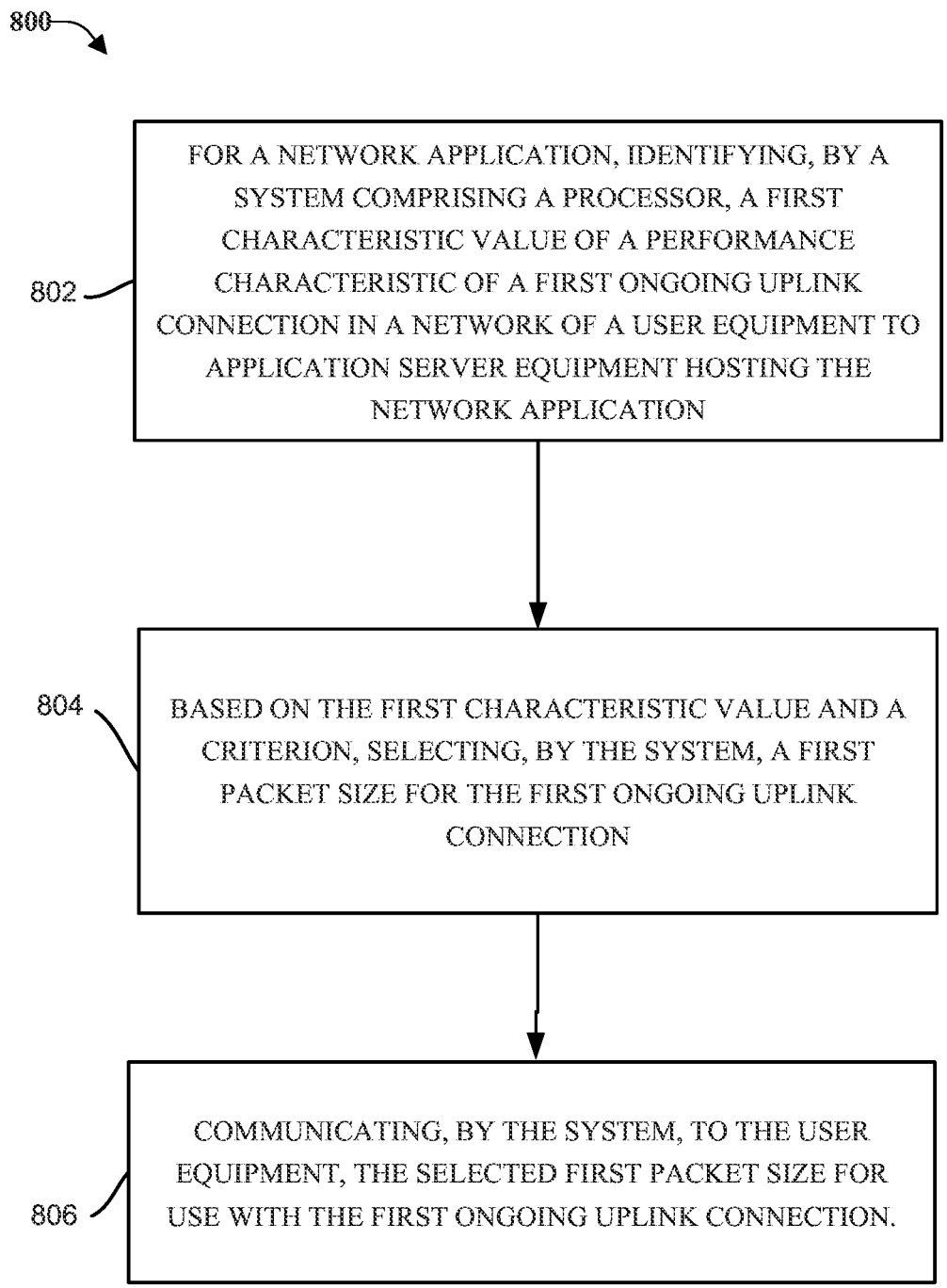
FIG. 8 illustrates an example method that can facilitate controlling network transmission parameters to reduce streaming latency, in accordance with one or more embodiments.

FIG. 8 illustrates an example method 800 that can facilitate modeling signal propagation from a signal point on a graphical representation, in accordance with one or more embodiments. For purposes of brevity, description of like elements and/or processes employed in other embodiments is omitted.

At 802, method 800 can include, for a network application, identifying, by a system comprising a processor, a characteristic value of a performance characteristic associated with an uplink connection enabled via a network of a user equipment to application server equipment hosting the network application. At 804, method 800 can further include, based on the characteristic value and a criterion, selecting, by the system, a first packet size for the uplink connection. At 804, method 800 can further include, communicating, by the system, to the user equipment, the first packet size for use with the uplink connection.

Figure 9:
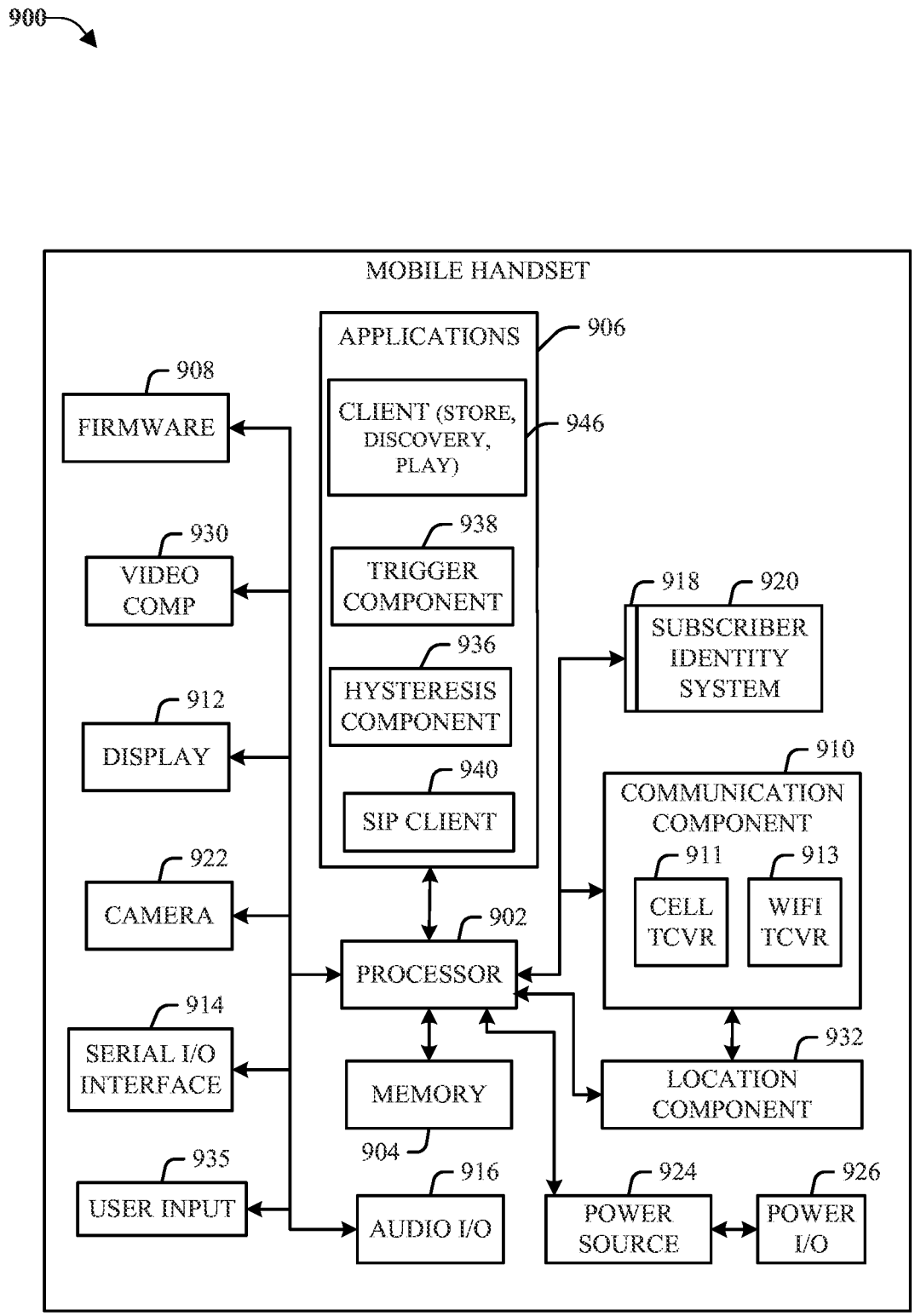
FIG. 9 illustrates an example block diagram of an example mobile handset operable to engage in a system architecture that can facilitate processes described herein, in accordance with one or more embodiments.

FIG. 9 illustrates an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1294) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Network 190 can employ various cellular systems, technologies, and modulation schemes to facilitate wireless radio communications between devices. While example embodiments include use of 5G new radio (NR) systems, one or more embodiments discussed herein can be applicable to any radio access technology (RAT) or multi-RAT system, including where user equipments operate using multiple carriers, e.g., LTE FDD/TDD, GSM/GERAN, CDMA2000, etc. For example, wireless communication system 200 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

Various embodiments described herein can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Figure 10:
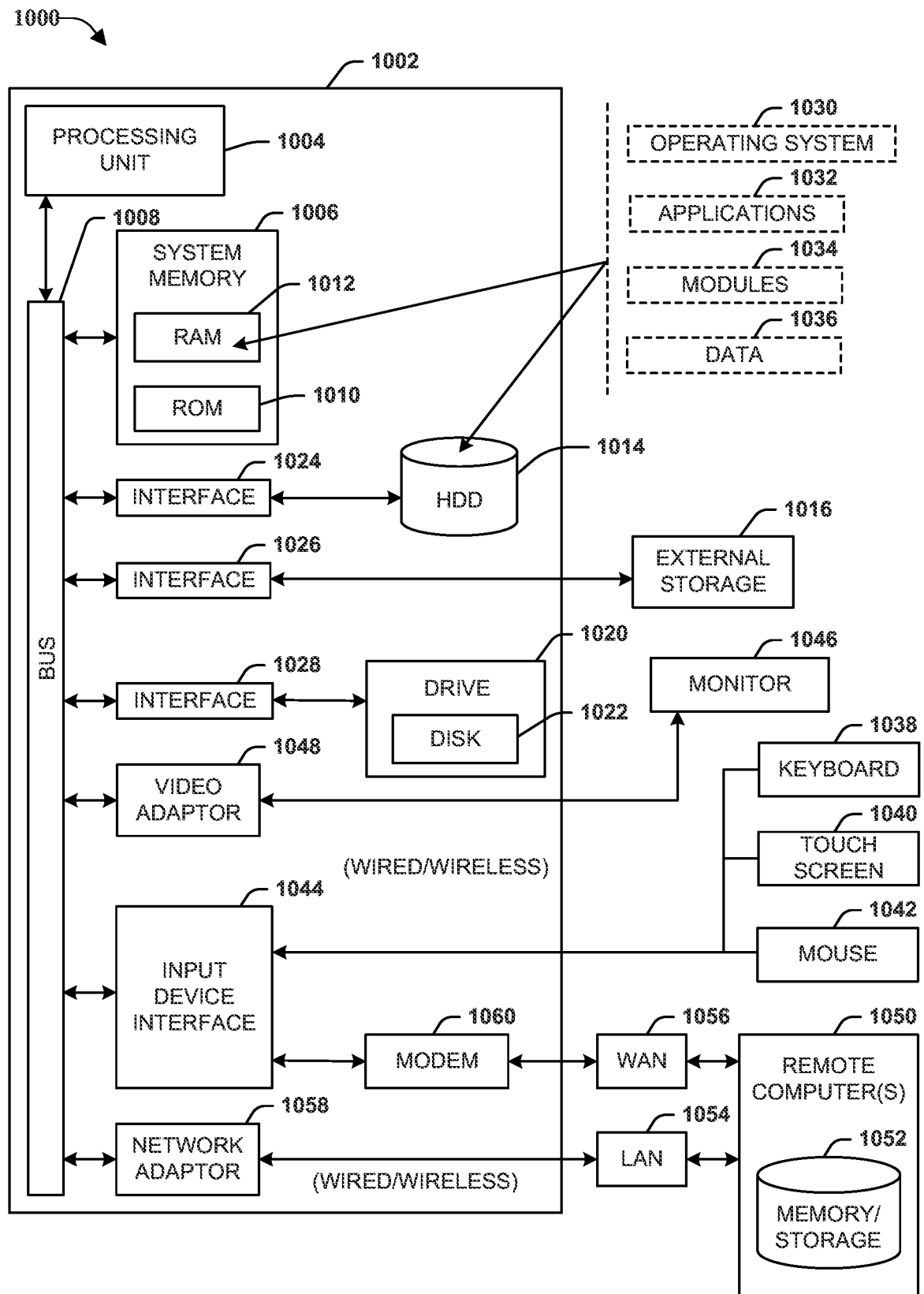
FIG. 10 illustrates an example block diagram of an example computer operable to engage in a system architecture that can facilitate processes described herein, in accordance with one or more embodiments.

FIG. 10 provides additional context for various embodiments described herein, intended to provide a brief, general description of a suitable operating environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example operating environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and a drive 1020, e.g., such as a solid state drive, an optical disk drive, which can read or write from a disk 1022, such as a CD-ROM disc, a DVD, a BD, etc. Alternatively, where a solid state drive is involved, disk 1022 would not be included, unless separate. While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and drive 1020 can be connected to the system bus 1008 by an HDD interface 1024, an external storage interface 1026 and a drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above, such as but not limited to a network virtual machine providing one or more aspects of storage or processing of information. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further to the description above, as it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipments do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used, or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be affected across a plurality of devices. Accordingly, the embodiments are not to be limited to any single implementation, but rather are to be construed in breadth, spirit and scope in accordance with the appended claims.

What is claimed is:

1. Network equipment, comprising:
   a processing system including a processor; and
   a memory that stores executable instructions that, when executed by the processing system, facilitate performance of operations, comprising:
      for an augmented reality application, identifying a characteristic value of a performance characteristic associated with an uplink connection, enabled via a network, between a user equipment and application server equipment hosting the augmented reality application,
      based on augmented reality test data received from the user equipment, predicting a surge in uplink traffic associated with the augmented reality application, resulting in a predicted surge,
      based on the characteristic value, the predicted surge, and a criterion, selecting a first packet size for the uplink connection, and
      communicating, to the user equipment, the first packet size for use with the augmented reality application.

2. The network equipment of claim 1, wherein the characteristic value comprises a first latency value associated with the uplink connection, wherein selecting based on the criterion comprises selecting based on the first latency value being determined to be above a threshold, and wherein selecting the first packet size comprises selecting a smaller packet size than a current packet size of packets applicable to the uplink connection.

3. The network equipment of claim 2, wherein the operations further comprise:
identifying a second latency value;
based on the second latency value being determined to be below the threshold, selecting a second packet size for the uplink connection; and
communicating, to the user equipment, the second packet size for use with the uplink connection.

4. The network equipment of claim 2, wherein selecting the smaller packet size comprises determining that, for the predicted surge, a selected smaller packet size is threshold likely to result in a reduction in latency that is greater than a latency increase in latency resulting from an overhead increase in overhead caused by the selected smaller packet size.

5. The network equipment of claim 1, wherein the augmented reality test data comprises data with characteristics of augmented reality data uploaded via the uplink connection by the user equipment during operation of the augmented reality application.

6. The network equipment of claim 5, wherein the uplink connection is used to communicate information describing a virtual object of the augmented reality application or a virtual reality application.

7. The network equipment of claim 1, wherein the selecting based on the criterion comprises selecting based on an identification of ongoing periodic background traffic being communicated from the user equipment via a background traffic connection.

8. The network equipment of claim 1, wherein the predicted surge is based on uplink traffic associated with an input received by the augmented reality application, and wherein the input was generated based on an inference determined using an artificial intelligence process.

9. The network equipment of claim 1, wherein the network equipment comprises edge cloud server equipment that supports at least a fifth generation communication network protocol.

10. A method, comprising:
based on a network connection to first network equipment hosting a distributed augmented reality application, operating, by a processing system including a processor of a user equipment, the distributed augmented reality application;
generating, by the processing system, augmented reality data for prediction, by second network equipment, that the network connection is threshold likely to be used to communicate a burst of data associated with the distributed augmented reality application, resulting in a predicted burst; and
receiving, by the processing system, from the second network equipment, a transmission unit parameter applicable to use of the network connection, wherein the transmission unit parameter was selected by the second network equipment based on the predicted burst and a characteristic value of a performance characteristic of the network connection identified by the second network equipment.

11. The method of claim 10, wherein, based on the characteristic value, the transmission unit parameter was selected to be a smaller transmission unit parameter than a current transmission unit parameter of the network connection.

12. The method of claim 11, wherein the characteristic value comprises a first latency value, and wherein the transmission unit parameter was selected to be the smaller transmission unit parameter based on the first latency value having been determined to have exceeded a threshold.

13. The method of claim 12, wherein the transmission unit parameter comprises a first transmission unit parameter, and wherein the method further comprises:
receiving, by the processing system, a second transmission unit parameter applicable to limit use of the network connection, wherein the first transmission unit parameter is different than the second transmission unit parameter, and wherein the second transmission unit parameter was selected by the second network equipment based on a second latency value being determined to be below the threshold.

14. The method of claim 12, wherein the transmission unit parameter was selected based on a predicted reduction in latency, based on the user equipment employing the transmission unit parameter, being determined to be greater than a predicted increase in latency of the network connection, as a result of an increase in overhead caused by the user equipment employing the transmission unit parameter.

15. The method of claim 12, wherein the augmented reality data comprises data that was selected to facilitate prediction of aspects of communication by the user equipment via the network connection.

16. The method of claim 12, wherein the augmented reality data comprises dummy data selected to facilitate identification of a measure of a periodicity of periodic background traffic communicated via the network connection.

17. A non-transitory machine-readable medium, comprising executable instructions that, when executed by a processing system including a processor of a first network device, facilitate performance of operations, comprising:
using a network connection to a distributed augmented reality application, managing operation of the distributed augmented reality application;
generating augmented reality data for prediction that the network connection is likely to be used to communicate a data burst of associated with the distributed augmented reality application, resulting in a predicted data burst; and
applying a transmission unit parameter to utilization of the network connection, wherein the transmission unit parameter was generated based on the predicted data burst.

18. The non-transitory machine-readable medium of claim 17, wherein the transmission unit parameter was generated by a second network device based on the predicted data burst and a characteristic value of a performance characteristic of the network connection.

19. The non-transitory machine-readable medium of claim 18, wherein the characteristic value comprises a latency value associated with the network connection.

20. The non-transitory machine-readable medium of claim 19, wherein the network connection comprises an uplink network connection via which information is communicated describing a virtual object of the distributed augmented reality application.

* * * * *